US011307939B2

(12) United States Patent
Chen et al.

(10) Patent No.: US 11,307,939 B2
(45) Date of Patent: *Apr. 19, 2022

(54) LOW IMPACT SNAPSHOT DATABASE PROTECTION IN A MICRO-SERVICE ENVIRONMENT

(71) Applicant: Red Hat, Inc., Raleigh, NC (US)

(72) Inventors: Huamin Chen, Westboro, MA (US); Jay Vyas, West Concord, MA (US)

(73) Assignee: Red Hat, Inc., Raleigh, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/521,853

(22) Filed: Jul. 25, 2019

(65) Prior Publication Data

US 2019/0347166 A1 Nov. 14, 2019

Related U.S. Application Data

(63) Continuation of application No. 15/381,569, filed on Dec. 16, 2016, now Pat. No. 10,394,663.

(51) Int. Cl.
*G06F 11/14* (2006.01)
*G06F 16/11* (2019.01)
*G06F 11/30* (2006.01)

(52) U.S. Cl.
CPC ...... *G06F 11/1461* (2013.01); *G06F 11/3006* (2013.01); *G06F 16/128* (2019.01); *G06F 2201/80* (2013.01); *G06F 2201/84* (2013.01); *G06F 2201/87* (2013.01)

(58) Field of Classification Search
None
See application file for complete search history.

(56) References Cited

U.S. PATENT DOCUMENTS

| 5,701,480 | A | 12/1997 | Raz |
| 8,874,522 | B2 | 10/2014 | Guo et al. |
| 9,021,046 | B2 | 4/2015 | Mayo et al. |
| 2005/0149554 | A1 | 7/2005 | Chong |
| 2013/0103650 | A1 | 4/2013 | Natanzon et al. |
| 2014/0143401 | A1 | 5/2014 | Carlen et al. |

(Continued)

OTHER PUBLICATIONS

Smith, Sharon, "What is StorSimple Snapshot Manger?", Github.com, May 24, 2016, 8 pages.

(Continued)

*Primary Examiner* — Aleksandr Kerzhner
*Assistant Examiner* — Eddy Cheung
(74) *Attorney, Agent, or Firm* — Lowenstein Sandler LLP

(57) ABSTRACT

An implementation of the disclosure provides a method including identifying, by a processing device, a plurality of transactions in a transaction queue within a cloud computing environment, each of the transactions comprising an operation associated with a storage device of the cloud computing environment, comparing a priority status of at least one operation comprised by the transaction queue with a status threshold level associated with the snapshot policy, and responsive to determining that the priority status of at least one operation meets the status threshold level, providing, by the processing device subsequent to an execution of the at least one operation, a request to generate a point-in-time snapshot of at least a portion of the storage device, the point-in-time snapshot comprising state information corresponding to an application in the storage device.

20 Claims, 6 Drawing Sheets

(56) References Cited

U.S. PATENT DOCUMENTS

2014/0279907 A1  9/2014  Koza et al.
2014/0379658 A1  12/2014 Cheriton
2016/0034481 A1  2/2016  Kumarasamy et al.
2016/0048408 A1  2/2016  Madhu et al.
2016/0062846 A1  3/2016  Nallathambi et al.

OTHER PUBLICATIONS

"Application-Aware Snapshot Management for Hitachi Virtual Storage Solutions", Hitachi Data Systems, 4 pages.
"How to Take Container Snapshots in Dockers", Stack Overflow, 1 page.
Siebert, Eric, "Top eight VMware vSphere backup best practices", Oct. 28, 2016, 8 pages.
USPTO, Office Action for U.S. Appl. No. 15/381,569, dated May 8, 2017.
USPTO, Final Office Action for U.S. Appl. No. 15/381,569, dated Dec. 13, 2017.
USPTO, Office Action for U.S. Appl. No. 15/381,569, dated Jul. 23, 2018.
USPTO, Final Office Action for U.S. Appl. No. 15/381,569, dated Feb. 7, 2019.
USPTO, Advisory Action for U.S. Appl. No. 15/381,569, dated Apr. 2, 2018.
USPTO, Notice of Allowance for U.S. Appl. No. 15/381,569, dated Apr. 9, 2019.

LOW IMPACT SNAPSHOT DATABASE PROTECTION IN A MICRO-SERVICE ENVIRONMENT

RELATED APPLICATIONS

This application is a continuation of U.S. patent application Ser. No. 15/381,569, filed on Dec. 16, 2016, the entire content of which is incorporated by reference herein.

TECHNICAL FIELD

The disclosure is generally related to generally to computing infrastructures and, more specifically, relate to low impact snapshot database protection in a micro-service environment.

BACKGROUND

Employing micro-services allows breaking down complex software applications into relatively simple independent processes, thus producing highly decoupled systems. Each system may include multiple applications that are hosted on a provider's infrastructure. Each process associated with the services is focusing on doing a relatively simple task to support the applications for each individual costumer.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
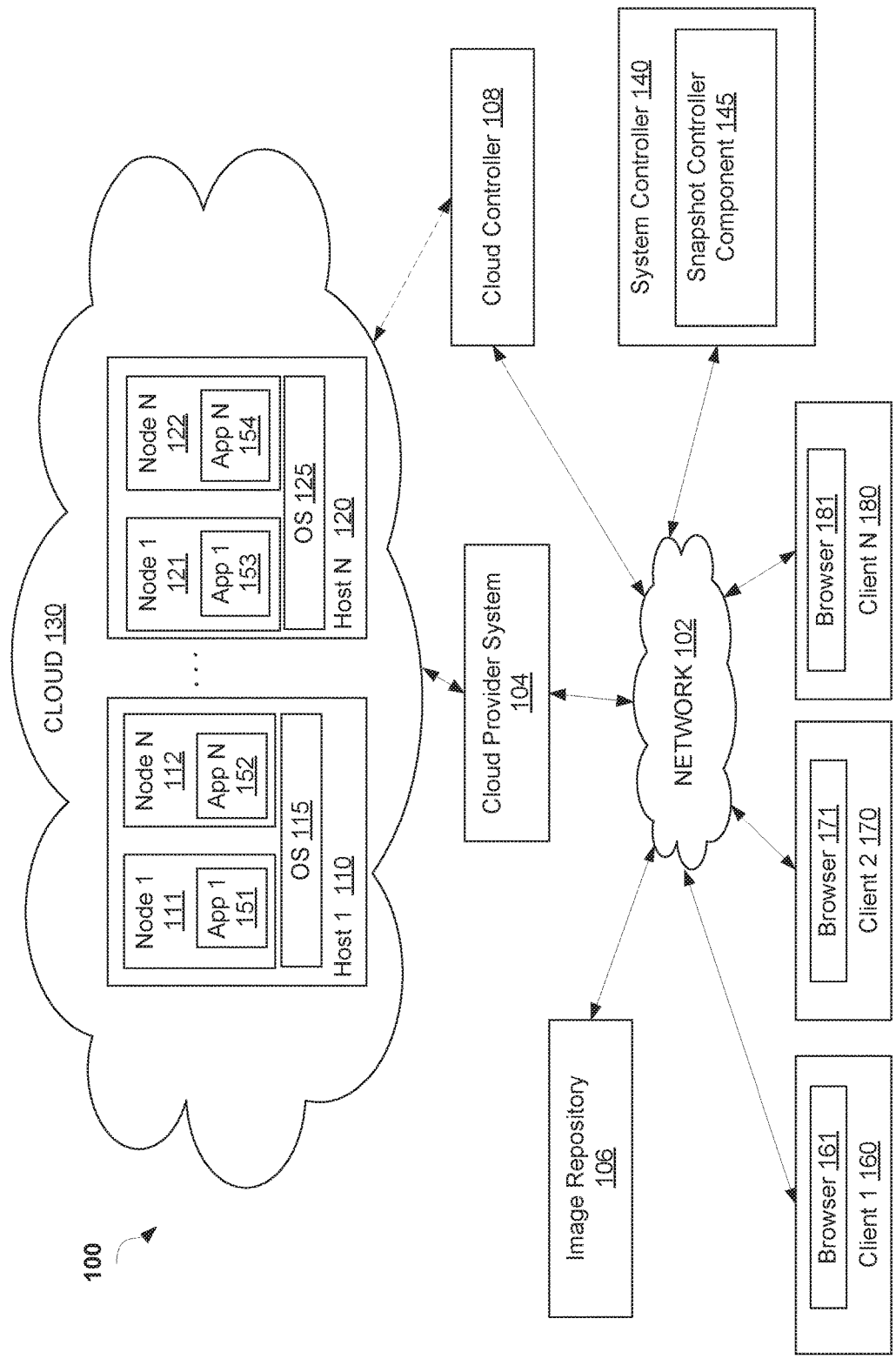
FIG. 1 is a block diagram of a network architecture in which implementations of the disclosure may operate.

A micro-service is an independently-deployable modular service that communicates with other services in a system (e.g., a cloud-based system) through a lightweight interface. These micro-services may be executed in containers to create containerized applications. A "container" herein shall refer to an interface between a host machine and a software application. The software application may comprise one or more related processes and may provide a certain service (e.g., an HTTP server, a database server, etc.). Containerization is an operating-system-level virtualization environment of a host machine that provides a way to isolate the micro-service processes. At the same time, employing the containers makes it possible to develop and deploy new cloud-based micro-services in a cloud system.

Some micro-service systems support multi-tier architectures. For example, in a micro-service system, there may be a frontend tier that handles application requests (e.g., Hypertext Transfer Protocol (HTTP) requests), a middleware tier that provides services for integration and deployment of applications and monitoring of application flows and related data, and a storage tier that is provisioned from a backend storage device. Each tier may be implemented using one or more containers. For example, the frontend tier may run multiple HTTP instance containers, the middleware tier may run multiple middleware services containers, and the storage tier may run multiple database containers that store database tables on persistent storage associated with the storage device. Each container associated with the tiers can be stopped and restarted without introducing service disruption. If, however, a database associated with the storage tier is stopped, the system must ensure that data associated with the database is consistently persisted. Otherwise data corruption or data loss can occur.

In some situations, the system may execute a snapshot to preserve data consistency. To take the snapshot, the system may freeze the database so that no queries or updates can be executed against the database during the snapshot taking operation. Upon freezing the database, the system stores data (which may be a full or partial database image, incremental delta of the image, etc.) into the storage device. Once the data is stored, a snapshot command may be executed by the system on the storage device to generate a point-in-time snapshot of a current state of the database. In that regard, the quality of service of the system can be adversely impacted at snapshot time because of the freezing of the databases. For example, if the database accumulated a large amount of changes, taking the snapshot can take significant amount of time that can cause certain processes to timeout or expire.

Implementations of the disclosure provide for low impact snapshots of database in a micro-service environment. The micro-service environment may execute a snapshot controller to provide database snapshots as a cloud-wide service available to any cloud tenant. In this regard, the snapshot controller can issue snapshot commands that are dispatched to the storage devices associate with the database. To issue the snapshots, the snapshot controller analyzes certain transaction information associated with the system. For example, the snapshot controller monitors point-in-time a transaction depth of the transaction queue in the middleware tier. The transaction depth indicates how many transactions are currently being processed by the middleware. The snapshot controller can also determine a priority level for transactions in the queue (which may include high or low priority operations associated with the transactions), as well as probe the database to determine how many transactions from the queue have been processed since the last snapshot has been taken.

Based on this transaction information, the snapshot controller may generate a schedule for issuing the snapshot commands using a plurality of snapshot policies. The snapshot policy may be a data structure (e.g., a database table) that stores conditions in which the system may generate the snapshot without adversely impacting system performance. In one example snapshot policy, a snapshot generating operation may be scheduled to start when the queue depth is below a certain level. An advantage of this policy is that it protects the database from freezing when there are a high number of transactions being processed. In another example snapshot policy, a snapshot generating operation may be scheduled to start when the number of transactions since last snapshot is less than a certain number. One advantage of this it that it ensures there are no bounded transactions (e.g., transactions associated with the same database lock) left unexecuted between snapshot windows. In yet another example snapshot policy, a snapshot generating operation may be scheduled to start when there are no high priority operations in the transaction queue. This policy ensures that high priority operations (e.g., operations from certain privileged users or admins) are not blocked by a snapshot. Still further, other snapshot policies are possible to ensure that any scheduled snapshot causes a minimal amount of performance impact or service disruption while allowing a high data availability of services in the micro-service system.

FIG. 1 is a block diagram of a network architecture 100 in which implementations of the disclosure may operate. In some implementations, the network architecture 100 may be used in a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 includes a cloud computing environment 130 (also referred to herein as a cloud) that includes nodes 111, 112, 121, 122 to execute applications and/or processes associated with the applications. In some implementations, these nodes may be virtual machines (VMs) that are hosted on a physical machine, such as host machine 1 110 through host machine N 120, implemented as part of the cloud 130. In some implementations, the host machines 110, 120 are located in a data center. For example, nodes 111 and 112 are hosted on physical machine 110 in cloud 130 provided by cloud provider 104. When nodes 111, 112, 121, 122 are implemented as VMs, they may be executed by OSs 115, 125 on each host machine 110, 120.

Users can interact with applications executing on the cloud-based nodes 111, 112, 121, 122 using client computer systems, such as clients 160, 170 and 180, via corresponding web browser applications 161, 171 and 181. In other implementations, the applications may be hosted directly on host machines 1 through N 110, 120 without the use of VMs (e.g., a "bare metal" implementation), and in such an implementation, the host machines themselves are referred to as "nodes".

Clients 160, 170, and 180 are connected to host machines 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host machine 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from system controller 140. In view of these commands, the cloud controller 108 provides data (such as pre-generated images) associated with different applications to the cloud provider system 104. In some implementations, the data may be provided to the cloud provider 104 and stored in an image repository 106, in an image repository (not shown) located on each host machine 110, 120, or in an image repository (not shown) located on each VM 111, 112, 121, 122. This data may be used for the execution of applications for a multi-tenant PaaS system managed by the system controller 140.

In one implementation, the data used for execution of applications includes application images built from pre-existing application components and source code of users managing the application. An image refers to data representing executables and files of the application used to deploy functionality for a runtime instance of the application. The image build system may be provided on components hosted by cloud 130, on a server device external to the cloud 130, or even run on nodes 111, 112, 121, 122. The image build system generates an application image for an application by combining pre-existing ready-to-run application image corresponding to core functional components of the application (e.g., a web framework, database, etc.) with source code specific to the application provided by the user. The resulting application image may be pushed to an image repository (not shown) for subsequent use in launching instances of the application images for execution in the PaaS system.

Upon receiving a command identifying specific data (e.g., application data and files, such as application images, used to initialize an application on the cloud) from the system controller 140, the cloud provider 104 retrieves the corresponding data from the image repository 106, creates an instance of the image, and loads it to the host machines 110, 120 for execution by nodes 111, 112, 121, 122. In addition, a command may identify specific data to be executed on one or more of the nodes 111, 112, 121, 122. The command may be received from the cloud controller 108, from the system controller 140, or a user (e.g., a system administrator) via a console computer or a client machine.

When the specific command is executed at a particular node, certain transactions may be produced. For example, a transaction may include operations (e.g., two operations in which one may be rolled back if the other operation fails) to be performed within a database, such as the image repository 106, associated with a storage device (not shown). In some situations, the operation may change the state of the data in storage device. In such situations, a user of a client, such clients 160, 170, 180 and/or administrators, may request that the system 100 to execute a snapshot either before or after the changes to the data in the storage device are made as a result of the operations. In this regard, the snapshot preserves a state of the data store at a particular point in time that the snapshot is taken.

In accordance with implementations, the network architecture 100 may include a plugin, such as a snapshot controller component 145, which is installed to provide a low impact snapshot of the storage device in the cloud infrastructure. In some implementations, the snapshot controller component 145 may be feed, for example, via an interface of the system controller 140, a plurality of snapshot policies that are used to determine when to schedule the start of a snapshot command for the data store. The functionally of the snapshot controller component 145 can exist in a fewer or greater number of modules than what is shown, with such modules residing at one or more processing devices of the network architecture 100, which may be geographically dispersed. The snapshot controller component 145 may be operable in conjunction with the system controller 140 from which it may receive and determine relevant information regarding transactions associated with the data store as discussed in more detail below.

Figure 2:
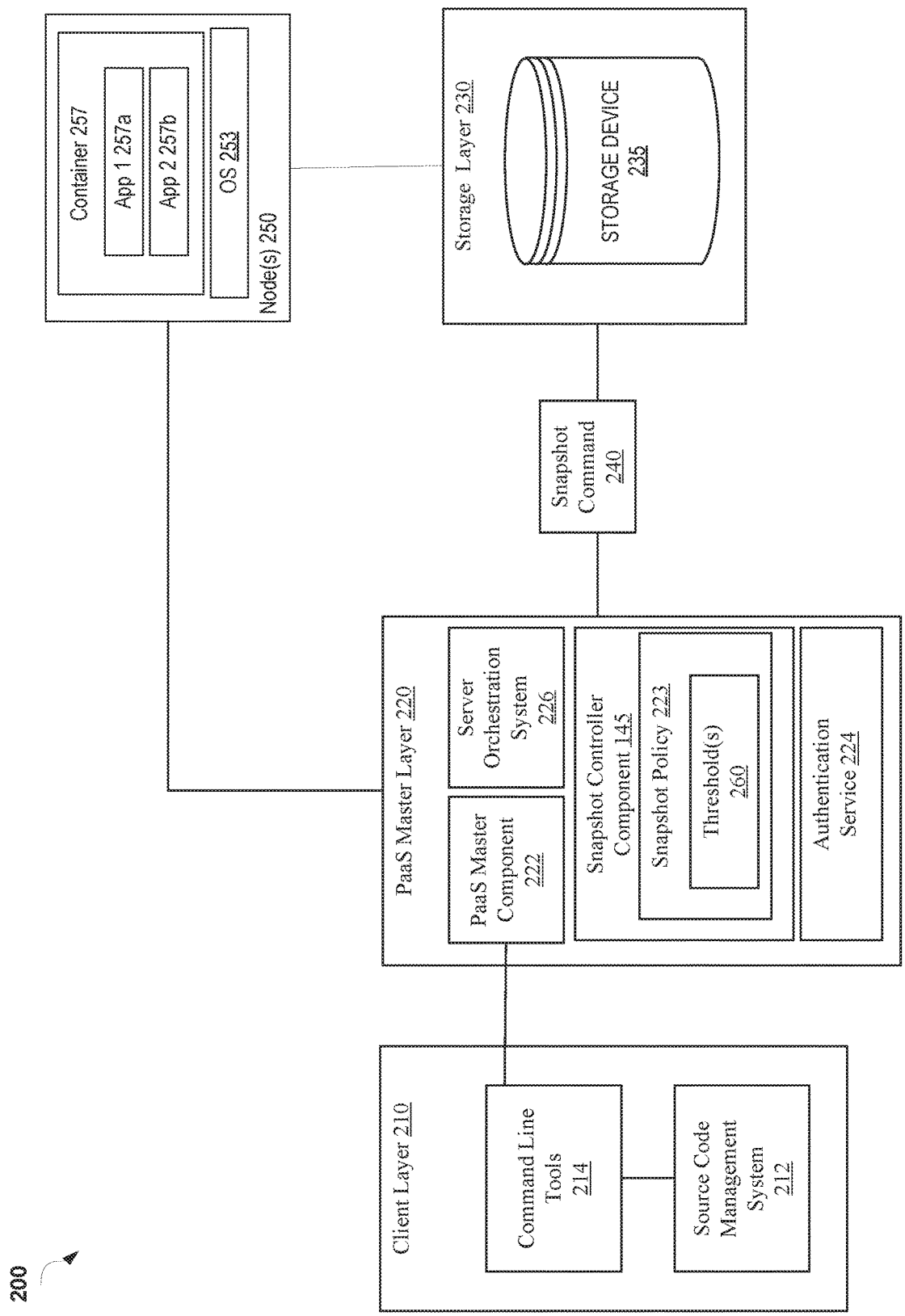
FIG. 2 is a block diagram of system for providing low impact snapshot database protection according to an implementation of the disclosure.

FIG. 2 is a block diagram of system 200 for providing low impact snapshot database protection according to an implementation of the disclosure. In some implementations, the system 200 is PaaS system 200 that allows users to launch software applications in a cloud computing environment, such as cloud computing environment provided in the network architecture 100 described with respect to FIG. 1. In some implementations, the PaaS system 200 includes a client layer 210, a PaaS master layer 220, and a storage layer 230. The client layer 210 resides on a client machine, such as a workstation of a software developer, and provides access the components of the system 200 to a user via an interface of the client machine. The PaaS master layer 220 may facilitate the creation and deployment on the cloud (via nodes 250) of software applications being developed by an end user at the client layer 210. The storage layer 230 may include a storage device 235 to facilitate the storage of information about the nodes 250 and their applications 257a-b. The components of the PaaS system 200 are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client machines of the client layer 210 can be a client 160, 170, 180 described with respect to FIG. 1. In one implementation, the client layer 210 includes a source code management (SCM) system 212. The SCM systems may include a working directory for making changes, and a local software repository for storing the changes for an application associated with the end user of the PaaS system 200. The packaged software application can then be "pushed" from the local SCM repository to, for example, the storage layer 230 where code of the packaged software application may be edited by others with access, or the application may be executed by a machine.

The client layer 210, in one implementation, also includes a set of command line tools 214 that a user can utilize to create, launch, and manage applications using a PaaS system. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as is described in more detail further below in accordance with some implementations.

The PaaS master layer 220, in one implementation, acts as middleware layer of the system 200. For example, the PaaS master layer 220 includes a PaaS master component 222 that coordinates requests from the client layer 210 with actions to be performed at the nodes 250. Examples of the requests can include a request to create an application, a request to perform an action (e.g., creating, removing, and/or managing a container) on a container, such as container 257, a request to deploy source code of an application, a request to designate a system to host an application, etc. In some implementations, the PaaS master layer 220 may be implemented on one or more machines separate from machines implementing each of the client layer 210, the nodes 250 and the storage layer 230, or may be implemented together with the client layer 210, nodes 250 and/or the storage layer 230 on one or more machines, or some combination of the above.

In one implementation, a user, using the command line tools 214 at client layer 210, can request the creation of a new application 257a-b, the deployment of source code of the application 257a-b, the designation of a system that hosts a remote SCM repository for the application 257a-b, etc. In response to receiving such a request, the PaaS master component 222 may first authenticate the user using an authentication service 224. In one implementation, the authentication service 224 may comprise various authentication methods, or standard protocols. Once the user has been authenticated and allowed access to the PaaS system by authentication service 224, the PaaS master component 222 uses a server orchestration system 226 to collect information about the nodes 232a-c. The server orchestration system 226, in one embodiment, functions to coordinate server-client interaction between multiple (sometimes a large number of) servers. In one embodiment, the servers being orchestrated are nodes 250, which are acting as application servers and web servers.

In implementations of the disclosure, the PaaS system 200 of FIG. 2 is a multi-tenant PaaS environment. In a multi-tenant PaaS environment, each of the nodes 250 can run multiple applications 257a-b that may be owned or managed by different users (e.g., owners) and/or organizations. As such, a first customer's deployed applications 257a-b may co-exist with any other customer's deployed applications on the same node that is hosting the first customer's deployed applications 257a-b. In some implementations, portions of an application execute on multiple different nodes 250.

In one implementation, each of the nodes 250 is implemented as a VM and has an operating system 253 that can execute applications 257a-b that are resident on the nodes 250. A node runs an application by launching an instance of an application image in a container 257. A container 257 is a secure process space on the nodes 250 to execute functionality of an application 257a-b. In some implementations, a container 257 is established at the nodes 250 with access to certain resources of the system 200, including memory, storage, and security types and/or labels to be applied to any functions executed by the container 257. In one implementation, the containers 257 may be established using a container execution environment (e.g., Kubernetes™ environment).

An application image may be generated from a combination of pre-existing ready-to-run application images related to core functionality of the application and source code provided by a user of the application. For example, the pre-existing ready-to-run application images may include support software providing functionality (e.g., configuration templates, scripts, dependencies, etc.) used to run the application 257a-b and/or add a feature to the application 257a-b.

Application image instances for an application 257a-b launched in container 257 may be dispersed over more than one of the nodes. In other implementations, application images instances for an application 257a-b may run in one or more containers 257 on the same node. Furthermore, an application 257a-b may use more than one application image as part of providing functionality for the application 257*a-b*. One example of this is a JavaEE™ application that uses a JBoss™ application server-based application image with a supporting MySQL™ database provided by a MySQL™ based application image. Each application image built at build system may map to a functional component of the application 257*a-b*. As such, an application may have more than one application image associated with the application. Built application images may be pushed application image repository to the storage device 235 of storage layer 230 for storage and accessibility for subsequent use in launching instances of the application images at containers 257 in nodes 257*a-b*.

To maintain consistency of data in the storage layer 230, the PaaS system 200 includes a snapshot controller component 145. The snapshot controller component 145 may issue a snapshot command 240 to perform a snapshot operation on one or more data structures in the storage device 235. For example, the snapshot controller 145 can issue vendor-neutral snapshot commands that are translated by the server orchestration system 226 into vendor-specific commands (e.g., commands issues by a vendor for executing a snapshot on a particular type of storage device produced by that vendor). The server orchestration system 226 may then dispatch the commands to the storage layer 230. In some implementation, the snapshot command 240 may be a request to create a snapshot of an application image associated with the applications 257*a-b* to perverse at a moment in time at least part of the storage device comprising the image.

In some implementations, the snapshot controller component 145 issues the snapshot command 240 using a snapshot policy 223 that may be set, for example, by a user of the system 200. The snapshot policy 223 may indicate various conditions in which the snapshot controller component 145 may issue the snapshot command 240 to ensure that the snapshot does not adversely affect system performance. For example, the snapshot controller component 145 may issue a request to the PaaS Master Component 222 to monitor a transaction queue (not shown). In some implementations, the transaction queue may include a series of identifiers of operations that are to be executed by an application with respect to the storage device 235. For example, the identifiers may be a memory address that identifies a location where related content for executing the operation may be stored. In some implementations, the identifiers may be placed onto the transaction queue by the storage device 235 at the storage layer 230 and are removed from queue by the device 235 after they are executed. Each operation associated with the identifiers may be a type of transaction, such as a database transaction, to be executed at the storage layer 230. These operations may indicate various changes that are to be applied to the application images stored in the storage device 235.

The snapshot controller component 145, in some implementations, may be triggered to issue the snapshot command 240 when the transaction queue is in compliance with the snapshot policy 223. For example, the snapshot policy 223 includes a plurality of conditions defining the thresholds 260 related to operations in the transaction queue that are to be executed on the storage device 235. For example, some of these thresholds 260 may include, but not limited to, a depth threshold that represents a determined number in which operations in the transaction queue to be executed should be below for a snapshot to be executed, a transaction threshold that represents a determined number in which the number of transactions executed since the last snapshot was taken should be below for a snapshot to be executed, and a priority threshold indicating that the priority status of operations in the transaction queue should be below a determined level. In some implementations, the priority level of the operations 345 may be determined based on various factors, such as whether the user associated with the operation has certain privileges or whether the user paid a premium so that their operations get prioritized, etc.

In some implementations, the thresholds 260 may be adjusted, for example, by a user via an interface of the PaaS Master Layer 220. In alternative implementations, the thresholds 260 may adjusted by the system 200 based on an analysis of system performance levels related to current settings of the thresholds 260 or current available resources for executing a snapshot command. For example, the system 200 may increase or decrease a particular threshold, if it is detected that the current thresholds 260 are causing adverse effect in the system performance when a snapshot is executed.

If none of the thresholds 260 are met, then the transaction queue is considered in compliance with the snapshot policy 223, thus the snapshot controller component 145 may safely issue the snapshot command 240. If one or more of these thresholds 260 are met or exceeded, the snapshot controller component 145 may in response delay or reschedule the snapshot until the transaction queue is in compliance with the snapshot policy 223. When the snapshot controller component 145 determines that the snapshot command 240 can be issued based on the snapshot policy 223, a point-in-time snapshot comprising changes made to the application image since the last time a snapshot was taken is stored in the storage device 235. These snapshots can then be retrieved by the client layer 210, PaaS master layer 220 and/or nodes 250 of the system 200 for testing, rollback and other purposes related to the applications 257*a-b*.

Figure 3:
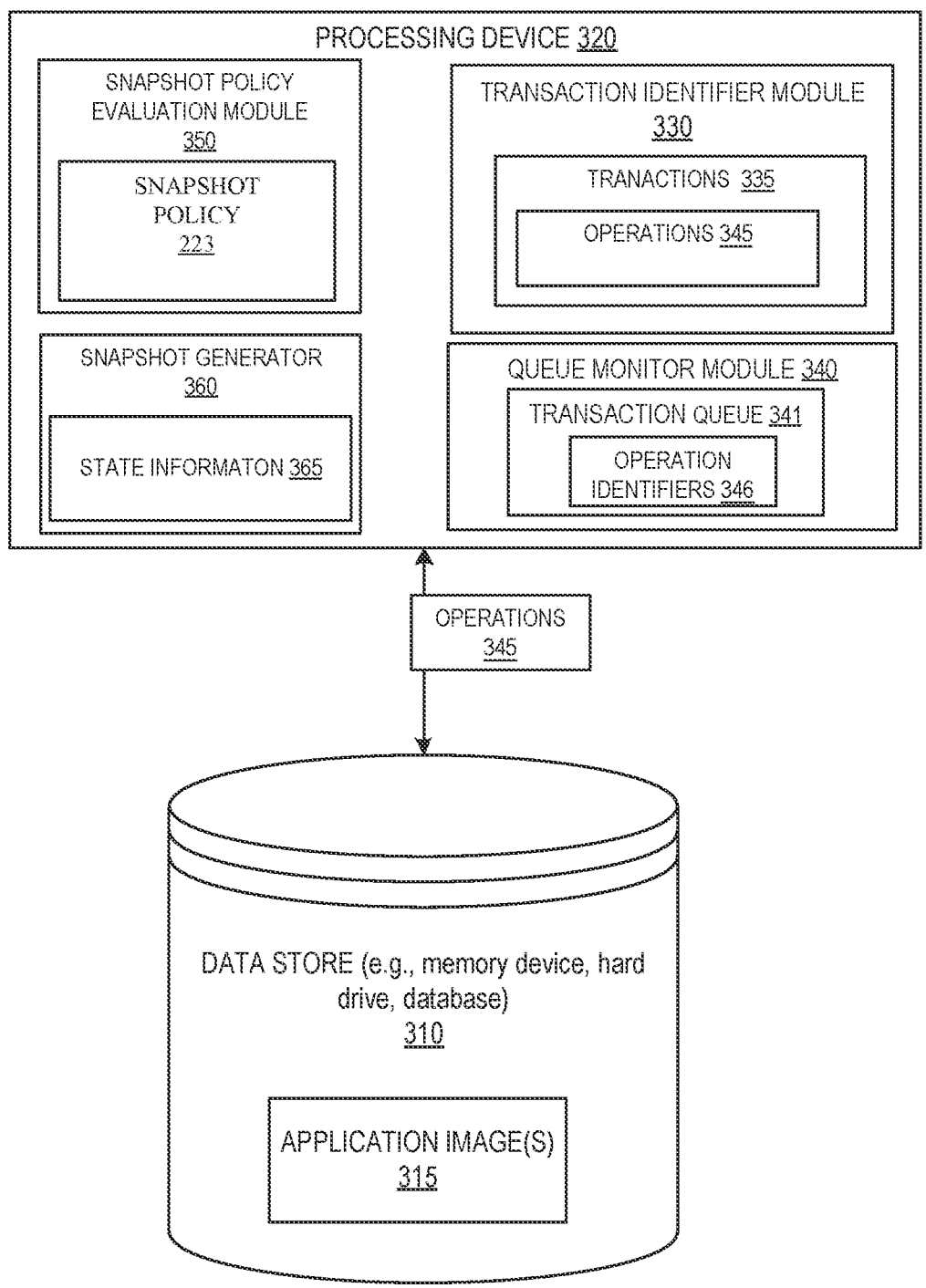
FIG. 3 is a block diagram of an apparatus including a memory for providing low impact snapshot database protection according to an implementation of the disclosure.

FIG. 3 is a block diagram of an apparatus 300 including a memory 310 for providing low impact snapshot database protection according to an implementation of the disclosure. The apparatus 300 may be the same or similar to a computing device within the network architecture 100 of FIG. 1 or the system 200 of FIG. 2. Apparatus 300 may include components and modules for issuing snapshot commands based on snapshot policy 223. In some implementations, the apparatus 200 may include a data store 310 (which may be compared to the storage device 235 of FIG. 2) and a processing device 320 coupled to the data store 310. In some implementations, the processing device 320 may execute instructions for carrying out the operations of the modules as discussed herein. As shown, these modules may include a transaction identifier module 330, a queue monitor module 340, a snapshot policy evaluation module 350, and a point-in-time snapshot generator 360 to issue commands to take snapshots of data (e.g., application images) stored in data store 310.

Data store 310 may include any non-persistent data storage (e.g., memory), persistent data storage (e.g., flash storage, hard drive, tape), other medium, or combination thereof that is capable of storing instructions for carrying out the operations of the components and module discussed herein. In some implementations, the data store 210 may store application images 315 and relevant information associated with those images. In some implementations, the application images 315 in the data store 310 may be updated. For example, the application images 315 may be changed related to a development or use of a corresponding application being executed by the processing device 320.

The transaction identifier module 330 can identify a plurality of transactions 335 associated with the date store 310. Each of the transactions 335 may include an operation 345 to be executed in the date store 310. For example, the transactions 335 may be database transactions associated with the data store 310 that may update an application image 315 stored therein. The application image 315 refers to data representing an application used to deploy functionality for a runtime instance of the application. In some implementations, changes to the application image 315 may be pushed to the data store 310 via the transactions 335.

The queue monitor 340 can monitor a transaction queue 341 that stores operation identifiers 346 for the operations 345 for execution by the application image 315 in the date store 310. For example, the transaction queue 341 may be a data structure (e.g., an array, table, etc.) that can store the operation identifiers 345 in a particular order for execution. In some implementations, the queue monitor 340 may issue a request to a service, such as the PaaS Master Component 222 of FIG. 2, to monitor the transaction queue 341. The service, in one implementation, provides services for the integration and deployment of applications as well as the monitoring of application flows and related data to the data store 310. The queue monitor 340 can identify various information regarding the transaction queue 341, such as a transaction queue depth corresponding to a number of the identifier 346 for the operations 345 in the transaction queue 341 to be executed by the application image 315, an amount of executed operations from the transaction queue 341 subsequent to a previous point-in-time snapshot taken of the application image 315, and a priority status of the operations in the transaction queue 341.

The snapshot policy evaluation module 350 can determine whether the monitored transaction queue 341 is in compliance with a snapshot policy 223. If it is determined that the transaction queue 341 is in compliance with the snapshot policy 223, the snapshot determination module 350 may indicate to the snapshot generator 360 that a snapshot of the storage device 310 can be executed. In some implementations, the compliance of the transaction queue 341 may be determined based on one or more thresholds associated with the snapshot policy 223 have been exceeded. For example, the snapshot policy 223 may include thresholds that may be used to indicate the best time to take a snapshot of the data store 310 while minimalizing any system impact.

In one example, the snapshot policy evaluation module 350 may compare a number of operations 345 comprised by the transaction queue 341 with a determined depth threshold level associated with the snapshot policy 223. If the transaction queue depth meets the depth threshold level, the snapshot determination module 350 may generate a request that is sent to the snapshot generator 360 to halt, delay or reschedule execution of the snapshot command. If the transaction queue depth is below the determined depth threshold level associated with the snapshot policy 223, the snapshot command may be scheduled to execute.

In another example, the snapshot policy evaluation module 350 may compare a number of executed operations since the last snapshot as identified by queue monitor 340 to a transaction threshold level associated with the snapshot policy 223. If it is determined that the transaction threshold level is met, the snapshot determination module 350 may generate a request that is sent to the snapshot generator 360 to halt, delay or reschedule execution of the snapshot command. Otherwise, the snapshot determination module 350 may indicate to the snapshot generator 360 that a snapshot of the storage device 310 can be executed.

In yet another example, the snapshot policy evaluation module 350 may compare a priority status of at least one operation in the transaction queue 341 as identified by queue monitor 340 to a status threshold level associated with the snapshot policy 223. For example, the snapshot determination module 350 determines whether there are any high priority operations 345 in the transaction queue 341. In some implementations, the priority status of an operation may be determined based on, for example, system settings, whether the user associated with the operation has certain privileges or whether the user paid a premium so that their operations get prioritized. If the status threshold level is met, the snapshot determination module 350 may generate a request that is sent to the snapshot generator 360 to generate the point-in-time snapshot following an execution of the at least one operation.

The snapshot generator 360 can generate a point-in-time snapshot of at least part of the data store 310 comprising state information 365 for the application image 315. For example, the snapshot generator 360 can issue a snapshot command to take a snapshot of the data store 310 in response to receiving an indication from the snapshot determination module 350 that the transaction queue 341 is in compliance with a snapshot policy 223. In some implementations, the state information 365 may include information indicating changes made to the application image 315 as a result of at least a portion of the operations 345 being executed in the data store 310. For example, the snapshot generator 360 may flushes operations from the transaction queue 341 into the data store 310 before the snapshot is executed.

Figure 4:
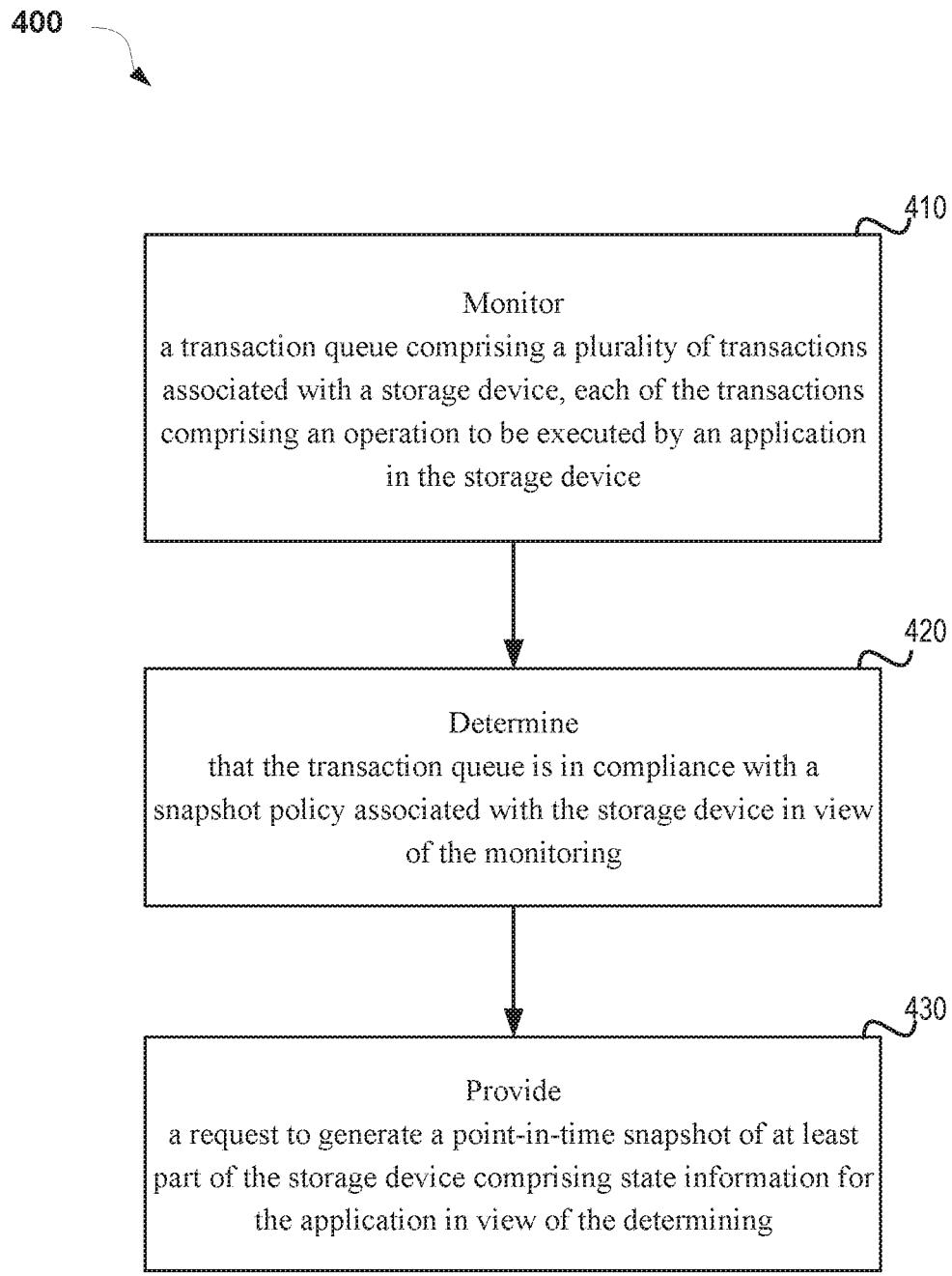
FIG. 4 illustrates a flow diagram illustrating a method for providing low impact snapshot database protection according to an implementation of the disclosure.

FIG. 4 depicts a flow diagram of one implementation of a method 400 in accordance with one or more aspects of the disclosure. In one implementation, the processing device 320 of FIG. 3 may perform method 400 to provide low impact snapshot database protection. The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Method 400 being in block 410 where a transaction queue comprising a plurality of transactions associated with a storage device is monitored. Each of the transactions comprising an operation to be executed by an application in the storage device. It is determined that the transaction queue is in compliance with a snapshot policy associated with the storage device in block 420 in view of the monitoring. In block 430, a request to generate a point-in-time snapshot of at least part of the storage device comprising state information for the application is provided in view of the determining.

Figure 5:
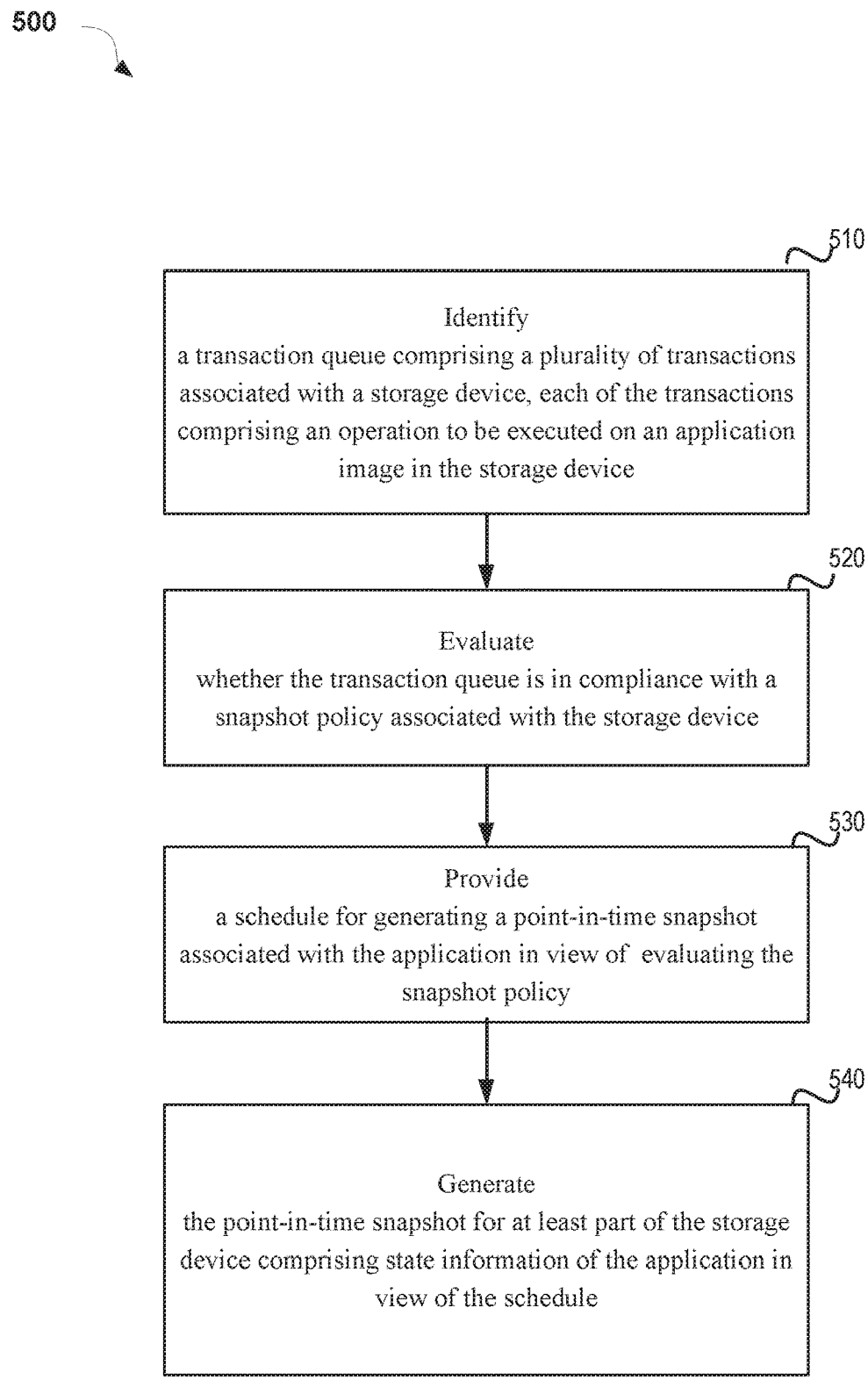
FIG. 5 illustrates a flow diagram illustrating another method for providing low impact snapshot database protection according to an implementation of the disclosure.

FIG. 5 depicts a flow diagram of one implementation of another method 500 in accordance with one or more aspects of the disclosure. In one implementation, the processing device 320 of FIG. 3 may perform method 500 to provide low impact snapshot database protection. The method 500 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 500 and each of its individual functions. In certain implementations, a single processing thread may perform method 500. Alternatively, two or more processing threads with each thread executing one or more individual functions, routines, subroutines, or operations may perform method 500. It should be noted that blocks of method 500 depicted in FIG. 5 can be performed simultaneously or in a different order than that depicted.

Method 500 being in block 510 where a transaction queue comprising a plurality of transactions associated with a storage device is identified. Each of the transactions comprising an operation to be executed by an application in the storage device. In block 520, the transaction queue is evaluated to determine whether it is in compliance with a snapshot policy associated with the storage device. A schedule for generating a point-in-time snapshot of the application is provided in block 530 in view evaluating the snapshot policy. In block 540, the point-in-time snapshot is generated for at least part of the storage device comprising state information of the application in view of the schedule.

Figure 6:
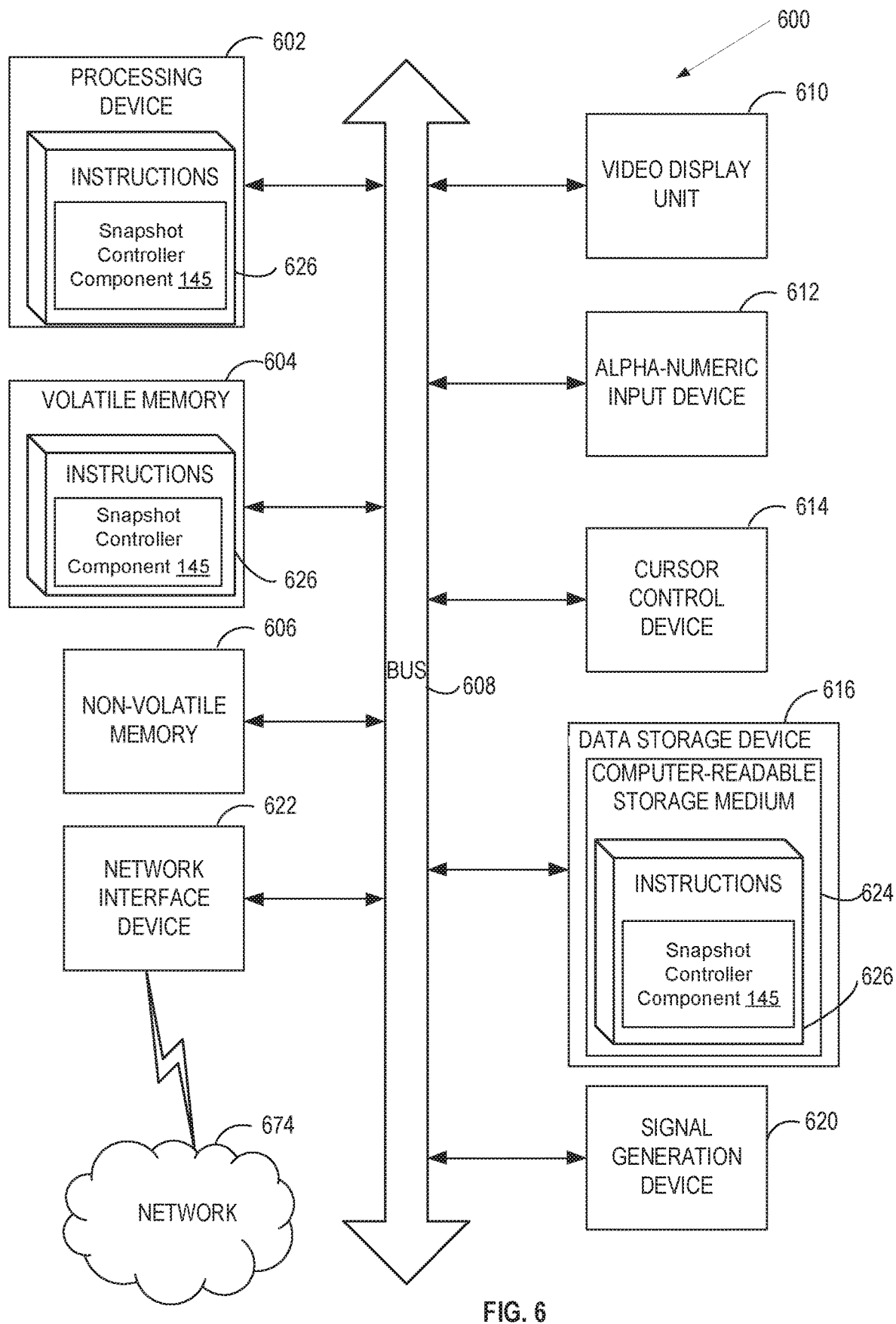
FIG. 6 illustrates a block diagram illustrating a computer system in which implementations of the disclosure may be used.

FIG. 6 depicts a block diagram of a computer system operating in accordance with one or more aspects of the disclosure. In various illustrative examples, computer system 600 may correspond to a processing device within system 100, system 200, or system 300 of FIG. 1, FIG. 2 and FIG. 3 respectively. The computer system may be included within a data center that supports virtualization. Virtualization within a data center results in a physical system being virtualized using virtual machines to consolidate the data center infrastructure and increase operational efficiencies.

A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding the snapshot controller component 145 of FIG. 1 for implementing method 400 of FIG. 4 or method 500 of FIG. 5 for low impact snapshot database protection in a microservice environment.

Instructions 626 may also reside, completely or partially, within volatile memory 604 and/or within processing device 602 during execution thereof by computer system 600, hence, volatile memory 604 and processing device 602 may also constitute machine-readable storage media.

While non-transitory computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "monitoring," "comparing," "selecting," "identifying," "generating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:
    a memory to store application data; and
    a processing device coupled to the memory to:
        identify a plurality of transactions in a transaction queue within a cloud computing environment, each of the transactions comprising an operation to be executed by an application with respect to a storage device of the cloud computing environment;
        compare a priority status of at least one operation corresponding to a transaction in the transaction queue with a status threshold level associated with a snapshot policy; and
        responsive to determining that the priority status of at least one operation corresponding to the transaction in the transaction queue meets the status threshold level, execute, subsequent to an execution of the at least one operation, a snapshot command to generate a point-in-time snapshot of at least a portion of the storage device modified by the operation corresponding to the transaction in the transaction queue, the point-in-time snapshot comprising state information corresponding to the application in the storage device.

2. The system of claim 1, wherein the processing device is further to determine whether the transaction queue is in compliance with the snapshot policy by comparing a first number of operations comprised by the transaction queue with a threshold level.

3. The system of claim 2, wherein the processing device is further to, responsive to determining that the first number of operations comprised by the transaction queue is below the threshold level, execute the snapshot command to generate the point-in-time snapshot.

4. The system of claim 2, wherein to determine whether the transaction queue is in compliance with the snapshot policy, the processing device is further to:
    determine a second number of executed operations comprised by the transaction queue that are executed following a previous point-in-time snapshot associated with the application; and
    compare the second number of executed operations with a transaction threshold level associated with the snapshot policy.

5. The system of claim 4, wherein the processing device is further to, responsive to determining that the second number of executed operations meets the transaction threshold level, execute the snapshot command to generate the point-in-time snapshot.

6. The system of claim 2, wherein the processing device is further to, responsive to determining that the transaction queue is not in compliance with the snapshot policy, at least one of delay or reschedule the point-in-time snapshot until the transaction queue is in compliance with the snapshot policy.

7. The system of claim 1, wherein the processing device is further to:
    determine whether the transaction queue is in compliance with the snapshot policy by comparing a first number of operations comprised by the transaction queue with a determined depth threshold level; and
    responsive to the first number of operations satisfying the determined depth threshold level, generate a request to at least one of halt, delay, or reschedule the point-in-time snapshot.

8. The system of claim 1, wherein the priority status of the at least one operation is determined based on at least one of system settings, privileges of a user associated with the at least one operation, or whether the user paid a premium for prioritizing the at least one operation.

9. A method comprising:
    identifying, by a processing device, a plurality of transactions in a transaction queue within a cloud computing environment, each of the transactions comprising an operation to be executed by an application with respect to a storage device of the cloud computing environment;
    comparing a priority status of at least one operation corresponding to a transaction in the transaction queue with a status threshold level associated with a snapshot policy; and
    responsive to determining that the priority status of at least one operation corresponding to the transaction in the transaction queue meets the status threshold level, providing, by the processing device subsequent to an execution of the at least one operation, a request to generate a point-in-time snapshot of at least a portion of the storage device modified by the operation corresponding to the transaction in the transaction queue, the point-in-time snapshot comprising state information corresponding to the application in the storage device.

10. The method of claim 9, further comprising determining whether the transaction queue is in compliance with the snapshot policy, wherein the determining further comprises comparing a first number of operations comprised by the transaction queue with a threshold level.

11. The method of claim 10, further comprising, responsive to determining that the first number of operations comprised by the transaction queue is below the threshold level, providing the request to generate the point-in-time snapshot.

12. The method of claim 10, wherein determining whether the transaction queue is in compliance with the snapshot policy further comprises:
   determining a second number of executed operations comprised by the transaction queue that are executed following a previous point-in-time snapshot associated with the application; and
   comparing the second number of executed operations with a transaction threshold level associated with the snapshot policy.

13. The method of claim 12, further comprising, responsive to determining that the second number of executed operations meets the transaction threshold level, providing the request to generate the point-in-time snapshot.

14. The method of claim 9, further comprising:
   determining whether the transaction queue is in compliance with the snapshot policy by comparing a first number of operations comprised by the transaction queue with a determined depth threshold level; and
   responsive to the first number of operations satisfying the determined depth threshold level, generating a request to at least one of halt, delay, or reschedule the point-in-time snapshot.

15. The method of claim 9, wherein the priority status of the at least one operation is determined based on at least one of system settings, privileges of a user associated with the at least one operation, or whether the user paid a premium for prioritizing the at least one operation.

16. A non-transitory computer-readable storage medium comprising instructions that when executed, by a processing device, cause the processing device to:
   identify, by the processing device, a transaction queue comprising a plurality of transactions associated with a storage device in a cloud computing environment, each of the transactions comprising an operation to be executed by an application in the storage device, the transaction queue storing identifiers of operations performed by the application;
   compare a priority status of at least one operation corresponding to a transaction in the transaction queue with a status threshold level associated with a snapshot policy; and
   responsive to determining that the priority status of the at least one operation corresponding to the transaction in the transaction queue meets the status threshold level, execute, subsequent to an execution of the at least one operation, a snapshot command to generate a point-in-time snapshot for at least a portion of the storage device modified by the operation corresponding to the transaction in the transaction queue, the point-in-time snapshot comprising state information corresponding to the application in the storage device.

17. The non-transitory computer-readable storage medium of claim 16, further comprising the processing device to evaluate whether the transaction queue is in compliance with the snapshot policy, wherein the snapshot policy indicates a priority level that the operations of the transaction queue are to satisfy, and wherein the priority level of the snapshot policy is to be adjusted in view of current available resources to execute the snapshot command, and wherein to evaluate whether the transaction queue is in compliance with the snapshot policy, the processing device further to compare a number of operations comprised by the transaction queue with a threshold level.

18. The non-transitory computer-readable storage medium of claim 16, wherein to evaluate, the processing device further to:
   determine a first number of executed operations comprised by the transaction queue that are executed following a previous point-in-time snapshot associated with the application; and
   compare the first number of executed operations with a transaction threshold level associated with the snapshot policy.

19. The non-transitory computer-readable storage medium of claim 18, wherein the processing device further to, responsive to determining that the first number of executed operations comprised by the transaction queue is below the transaction threshold level, execute the snapshot command to generate the point-in-time snapshot.

20. The non-transitory computer-readable storage medium of claim 18, wherein the processing device further to, responsive to determining that the first number of executed operations meets the transaction threshold level, execute the snapshot command to generate the point-in-time snapshot.

* * * * *